United States Patent [19]
Chatterley et al.

[11] Patent Number: 5,570,603
[45] Date of Patent: Nov. 5, 1996

[54] METHOD AND APPARATUS FOR COLD ROLLING PIPING ELEMENT CONNECTIONS HAVING MULTIPLE OUTWARD STEPS

[75] Inventors: Charles N. Chatterley, Coventry; Michael W. Horgan, West Warwick; Sandra M. Lippka, Warwick, all of R.I.

[73] Assignee: Grinnell Corporation, Cranston, R.I.

[21] Appl. No.: 385,768

[22] Filed: Feb. 8, 1995

Related U.S. Application Data

[63] Continuation-in-part of Ser. No. 114,662, Aug. 31, 1993, Pat. No. 5,450,738.

[51] Int. Cl.[6] .................................................. B21D 41/02
[52] U.S. Cl. ................................................. 72/101; 72/105
[58] Field of Search ............................. 72/101, 105, 106, 72/117, 118

[56] References Cited

U.S. PATENT DOCUMENTS

| | | | |
|---|---|---|---|
| 1,541,601 | 6/1925 | Tribe . | |
| 2,267,533 | 12/1941 | O'Brien | 285/129 |
| 2,689,752 | 9/1954 | Webster | 285/94 |
| 3,191,416 | 6/1965 | Pritchett | 72/106 |
| 3,290,914 | 12/1966 | Vaill et al. | 72/117 |
| 3,995,466 | 12/1976 | Kunsman | 72/105 |
| 4,408,788 | 10/1983 | Beukema | 285/419 |
| 5,279,143 | 1/1994 | Dole | 72/105 |
| 5,450,738 | 9/1995 | Chatterley et al. | 72/106 |

FOREIGN PATENT DOCUMENTS

| | | | |
|---|---|---|---|
| 535059 | 10/1931 | Germany | 72/105 |
| 18201 | 6/1916 | United Kingdom | 72/105 |

OTHER PUBLICATIONS

"The Copper Connection" (Victaulic, May 1990), 12 pages.
"AWWA Standard for Grooved and Shouldered Joints" (American Water Works Association, May 1987), 10 pages.
"Expanded Pipe Coupling Style 24" (Victaulic, 1985), 4 pages.
"GRUVLOK® Products for Grooved Piping Systems" (Grinnell Corporation, Sep. 1991), 60 pages.
"GRUVLOK® Pipe Machines" (Grinnell Corporation, Feb. 1992), 16 pages.

*Primary Examiner*—Lowell A. Larson
*Attorney, Agent, or Firm*—Fish & Richardson P.C.

[57] ABSTRACT

An apparatus for cold rolling a piping element connection with multiple outward steps has first and second rollers, a driver for the second roller, and a positioning roller. The first roller rotates about a first axis, with first and second upper surfaces of rotation centered thereabout, the first surface mean diameter being less than that of the second surface. The first roller has an upper leading edge between the first and second upper surfaces. The second roller is mounted for rotation about a second axis parallel to the first axis, with first and second lower surfaces of rotation centered thereabout, the first surface mean diameter being less than that of the second surface, and the second roller having a lower trailing edge between the first and second lower surfaces. The first and second rollers are mounted for movement together and apart in a plane of the first and second axes for engagement and cold rolling of multiple outward steps in the piping element connection placed therebetween which are essentially parallel to the centerline of the piping element connection that is positioned therebetween.

2 Claims, 8 Drawing Sheets

METHOD AND APPARATUS FOR COLD ROLLING PIPING ELEMENT CONNECTIONS HAVING MULTIPLE OUTWARD STEPS

This is a continuation-in-part of application Ser. No. 08/114,662, filed Aug. 31, 1993, now U.S. Pat. No. 5,450,738 granted Sep. 19, 1995.

BACKGROUND OF THE INVENTION

The invention relates to a method for joining tubing, fittings and valves of different standard diameter types.

For the purposes of the invention description presented herein, "CT" will be used to represent "standard water tube" size copper and copper alloy tubing, and "IP" will be used to represent "standard outside diameter" size steel pipe. In addition, the terms "tubing" and "pipe" are considered to be interchangeable, and reference to "copper tubing" will also be taken as referring to "copper alloy tubing" as an alternative.

Figure 1:
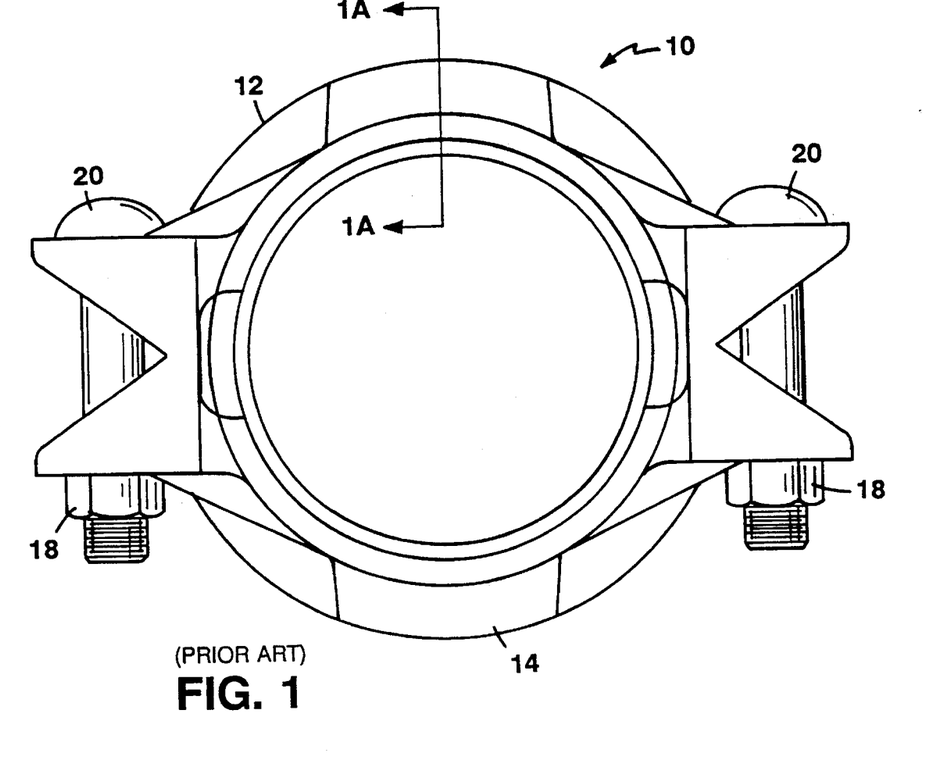
FIG. 1 is an end view of a typical prior art grooved end pipe coupling.
Figure 1A:
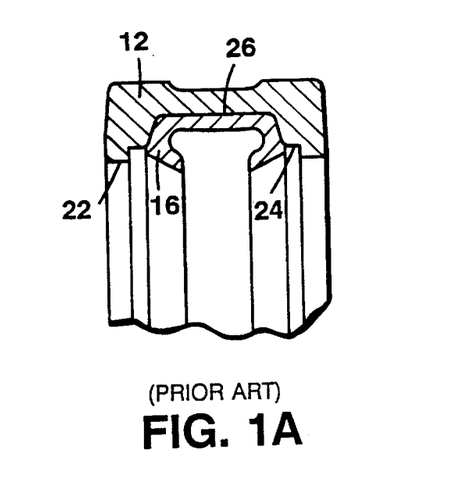
FIG. 1A is a side section view of the coupling housing and gasket taken at the line 1A—1A of FIG. 1.
Figure 2:
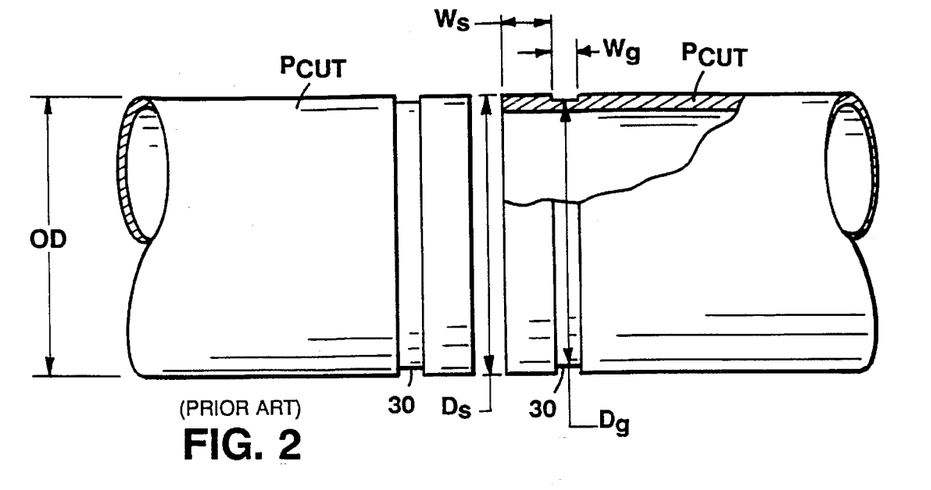
FIG. 2 is a side view of opposed ends of piping for a conventional cut grooved pipe end connection.
Figures 3, 4:
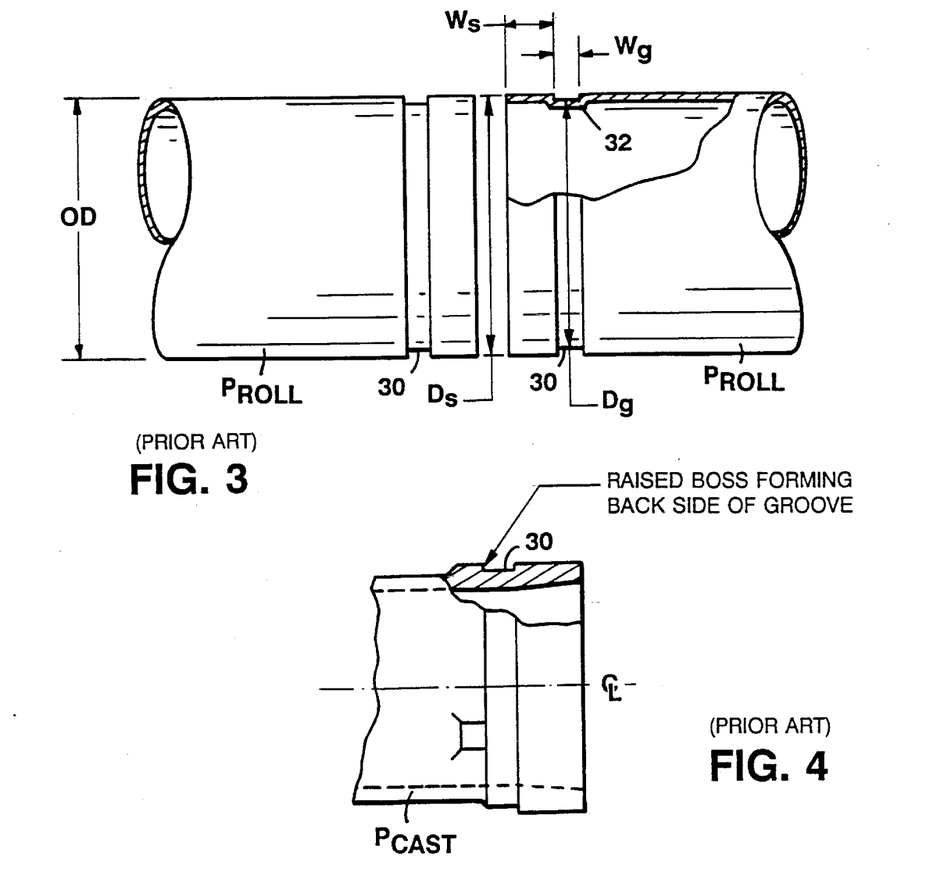
FIG. 3 is a side view of opposed ends of piping for a conventional roll grooved pipe end connection.
FIG. 4 is a side view of an end of a pipe for a conventional cast grooved pipe end connection.

A grooved end pipe coupling, e.g. of the type illustrated in FIGS. 1 and 1A, is used for joining together piping elements, e.g. tubing, fittings, valves, etc., in a leak tight assembly by use of grooves that are cut, cast or formed in the ends of the piping elements. Referring to FIGS. 2 and 3, critical parameters of a grooved end connection include: the gasket seat diameter, $D_s$, groove diameter, $D_g$, gasket seat width, $W_s$, and groove width, $W_g$. In the case of wrought metal piping elements, e.g., as above, tubing, fittings or valve bodies, the grooved end of the piping element, P, is conventionally produced by either a cut (machining) operation or a rolling (contour roll forming) operation as shown in piping element, $P_{cut}$, of FIG. 2, and piping element $P_{roll}$, of FIG. 3, respectively. In the case of a cast fitting or valve body, the grooved end connection is normally either cut in the configuration of a piping element, $P_{cut}$ shown in FIG. 2, or cast in the dual outward step configuration of a piping element, $P_{cast}$, shown in FIG. 4.

Cut grooves for use with grooved end pipe couplings are typically prepared by the use of a lathe and, heretofore, roll grooves for use with grooved end pipe couplings have been prepared by an apparatus similar in function to that described in Kunsman, U.S. Pat. No. 3,995,466 and Dole, U.S. Pat. No. 5,279,143. Both of these patents describe a means for contour roll forming a groove in the end of the pipe element by which a segment of the pipe is press formed or stretched into the desired configuration by forcing a shaped die roll located outside of the pipe against a form roll located inside of the pipe.

Other examples of contour roll forming of pipes are presented in Constantine, Great Britain Patent 18201, Pritchett et al., U.S. Pat. No. 3,191,416 and Vaill et al., U.S. Pat. No. 3,290,914. Although these letter three patent references describe devices which force a die roll located inside the pipe against a form located outside of the pipe, the contour roll forming principle is the same as for the previous two patent references. That is, the pipe is locally shaped by radial press forming or stretching, into the desired contour.

Referring again to FIGS. 1 and 1A, a typical grooved end pipe coupling 10 consists of two or more housing segments 12, 14, a gasket 16, and fastening means, e.g. nuts 18 and bolts 20 for securing the assembly together with the end connections to be joined. The housing segments have keys 22 around the inner periphery at both ends, a shoulder 24 also around and just inside of each key, and a gasket cavity 26. The keys fit into the grooves 30 to axially and transversely retain the end connections. The keys and shoulders are involved to varying degrees in maintaining the coupling assembly generally centered about the grooved end connection. The shoulder fits closely around the gasket seat diameter to prevent the gasket from extruding outwardly under the internal pressure of the piping system, the gasket being retained in the gasket cavity and producing a seal on the gasket seat surfaces to form a leak tight assembly.

Traditionally, copper tubing has been joined by soldering or brazing. However, recent emphasis on use of lead free solder has considerably increased the difficulty of producing a soldered, leak free joint, especially in the 3 inch and above tubing diameter sizes. This has increased the potential cost effectiveness of using grooved end pipe couplings in copper tubing system construction.

Until now, grooved end pipe couplings for joining copper piping elements (tubing, fittings, valves, etc.) have only been available in couplings specifically designed to accommodate roll grooved (contour roll formed) CT size wrought copper tubing, which has average outside diameters that are slightly less than those for the same nominal IP size steel pipe (as detailed, e.g., in the publication "The Copper Connection" by The Victaulic Company of America). By way of example only, a 4-inch nominal CT size copper tube has an average outside diameter ("OD") of 4.125 inches, while 4-inch nominal IP size steel pipe has an average outside diameter of 4.500 inches.

In addition to the use of specifically designed grooved end pipe couplings, however, within the present state of the art, other means have been employed to join tubing with an average outside diameter smaller than the actual diameter of an IP size steel pipe of the same nominal diameter. For example, a specially designed ring with an average outside diameter equivalent to that of IP size pipe may be secured in a sealed arrangement to the end of a tube having a smaller average outside diameter, or the average outside diameter of the pipe can be increased to that of IP size pipe through the use of a ring secured in a sealed arrangement around the ends of lower average diameter pipe. These approaches would be similar to the Type A through E pipe end ring concepts shown in AWWA Standard C-606 for Grooved and Shouldered Joints.

Also, within the grooved end pipe coupling industry, it has been known to expand the end of a pipe by contour roll forming although the published objectives of this concept have been to either expand the ends of IP size grooved end steel pipe to eliminate the reduced wall thickness of cut (machined) groove joints, or eliminate the protrusion 32 inside the pipe which is associated with conventional roll grooving as shown in FIG. 3, and described in Table A, below.

TABLE A

| Roll Groove Dimensions for Steel Pipe (Inches) | | | | |
| --- | --- | --- | --- | --- |
| NOMINAL | $W_s$ | $W_g$ | $D_g$ | $D_s$ |
| 2 | .625 | .344 | 2.250–.015 | 2.375 |
| 2½ | .625 | .344 | 2.720–.018 | 2.875 |
| 3 | .625 | .344 | 3.344–.018 | 3.500 |
| 4 | .625 | .344 | 4.344–.020 | 4.500 |
| 5 | .625 | .344 | 5.395–.022 | 5.562 |
| 6 | .625 | .344 | 6.455–.022 | 6.625 |
| Tolerances: | $W_s$, $W_g$ = ±.030 | | | |
| | $D_g$ = +.000 | | | |
| | $D_s$ = See IP size OD tolerances in TABLE I (below). | | | |

Prior art concerning roll grooving (contour roll forming) of copper tubing is also described in the brochure "The Copper Connection", by Victaulic Company of America, with respect to their specially designed copper connections. These grooved end couplings are of the same basic concept or design as grooved end pipe couplings for roll grooved IP size steel pipe; however, the dimensions of the couplings have been dimensionally altered to accommodate the smaller average outside diameter dimensions for copper tubing.

Standard roll grooving reduces the internal diameter of the tubing at the roll groove and thereby increases the restriction to the fluid flow stream. This somewhat impedes fluid flow through the pipe and also creates a more pronounced area for possible damage when used in abrasive media service. This factor is described in literature for the Victaulic Company of America Style 24 expanded pipe coupling, which is used to expand carbon steel pipe in abrasive service where the radially inward indentation created by standard roll grooving would be subject to excessive abrasion. This process, however, forms only the pipe end shoulder (gasket seating surface).

SUMMARY OF THE INVENTION

This invention describes an apparatus for cold rolling a piping element connection having multiple outward steps essentially parallel to the centerline of the piping element. The functioning principle or objective of this apparatus is distinguished from the prior art which utilizes contour roll forming to selectively stretch or press form areas adjacent to the end of the piping element connection in that, the apparatus of this invention utilizes cold rolling to selectively thin areas adjacent to the end of the piping element connection and, by so doing, cause the pipe to be locally expanded into multiple outward steps. The objection of the apparatus of this invention is further distinguished from the prior art by the fact that the cold rolling operation work-hardens the tubing which increases the ultimate tensile and yield strengths of the cold worked material which compensates for any loss in joint strength due to the slight thinning of the material making up the piping element connection. Contour roll forming does not do this. In addition, this cold rolling apparatus is distinguished from prior roll grooving art in that the rollers inside and outside the pipe of this invention both contact opposite wall surfaces of the piping element in the area of the groove parallel to the centerline of the piping element whereas, only the roller outside of the pipe is allowed to contact the groove wall surface in an area parallel to the centerline of the piping element, in the case of the prior art.

Lastly, the cold rolling apparatus of this invention is distinct from prior contour roll forming art used to outwardly stretch selected areas adjacent to the end of the pipe in that, in the case of the prior art, continued forcing of the die roll located inside of the pipe does not expand the pipe beyond the dimensions established by the form located outside of the pipe, whereas, with the apparatus of this invention, continued application of force by the roller located outside of the pipe against the roller located inside of the pipe, with the pipe wall therebetween, will continue to thin the pipe wall and locally expand the pipe.

According to the invention, an apparatus for cold rolling a piping element connection having multiple outward steps essentially parallel to the centerline of the piping element comprises a first roller mounted for rotation about a first axis, the first roller defining at least a first upper surface of rotation extending axially and centered about the first axis, and a second upper surface of rotation extending axially and centered about the first axis, the first upper surface having a mean diameter and the second upper surface having a mean diameter, the mean diameter of the first upper surface being less than the mean diameter of the second upper surface, and the first roller further defining an upper leading edge between the first upper surface and the second upper surface, a second roller mounted for rotation about a second axis parallel to the first axis, the second roller defining at least a first lower surface of rotation extending axially and centered about the second axis, and a second lower surface of rotation extending axially and centered about the second axis, the first lower surface having a mean diameter and the second lower surface having a mean diameter, the mean diameter of the first lower surface being greater than the mean diameter of the second lower surface, and the second roller further defining a lower trailing edge between the first lower surface and the second lower surface, means for driving the second roller to rotate about the second axis, and the first roller and the second roller mounted for relative movement together and apart in a plane of the first axis and the second axis for engagement and forming of multiple outward steps in a piping element connection placed therebetween, the first upper surface being disposed in substantial axial registration with the first lower surface, the second upper surface being disposed in substantial axial registration with the second lower surface, and the upper leading edge being offset axially from the lower trailing edge to provide a predetermined spacing dependent upon the wall thickness of the piping element in which multiple outward steps essentially parallel to the centerline of the pipe element are to be formed, and a means for offsetting the centerline of the piping element at a slight angle to the right of the plane formed by the first and second roller axes when viewing the second roller as rotating counterclockwise.

Preferred embodiments of this aspect of the invention may include one or more of the following additional features. The first lower surface has a taper extending axially and inwardly from a region of the lower trailing edge, toward the second axis. Preferably, the taper has an angle of approximately 1° to 3°. The second roller further defines an end surface adjacent the first lower surface and spaced from the lower trailing edge, the end surface extending radially outward and generally perpendicular to the second axis. The apparatus further comprises a means for offsetting the centerline of the piping element at an angle of 0.5° to 2° to the right of the plane formed by the first and second roller axes, when viewing the second roller as rotating clockwise, the means consisting of a first positioning roller mounted for rotation about a third axis parallel to the first axis and offset to a first side of the plane of the first and second axes, and a second positioning roller mounted for rotation about a fourth axis parallel to the first axis and offset to a second side, opposite the first side, from the plane of the first and second axes and having a surface positioned for engagement with an outside surface of the piping element. Preferably, the third axis is spaced from the plane by a first positioning distance and the fourth axis is spaced from the plane by a second positioning distance greater than the first positioning distance; the third axis being to the left of the plane and the fourth axis being to the right of the plane, when viewing the second roller as rotating counterclockwise.

According to another aspect of the invention, a method for cold rolling multiple outward steps in a piping element connection essentially parallel to the centerline of the piping element comprises the steps of: (a) providing a cold rolling apparatus as described above; (b) positioning an end of a piping element connection to be cold rolled with multiple outward steps between the first roller and the second roller, with the end of the piping element connection engaged with the end surface of the second roller, the piping element connection axis being angularly offset downward from the second axis when viewing the second roller as rotating clockwise; (c) engaging opposite inner and outer surfaces at an end region of the piping element connection between the first roller and second roller while providing support for the piping element connection at a point spaced from the end to be cold rolled, the second roller being driven; (d) causing the upper leading edge of the first roller to engage the outer surface of the piping element connection in a manner to produce a torque to draw the piping element connection toward the end surface of the second roller; (e) applying force to urge the first roller and the second roller together with the first upper surface disposed in substantial axial registration with the first lower surface, the second upper surface disposed in substantial axial registration with the second lower surface, and the upper leading edge offset axially from the lower leading edge to provide a predetermined spacing to accommodate the wall thickness of the piping element connection; (f) continuing application of force until the second upper surface of the first roller and the first lower surface of the second roller contact opposite wall surfaces of the piping element connection; (g) further continuance of the application of force to selectively thin areas adjacent to the end of the piping element connection until the pipe is locally expanded to within the desired range of diameters, and the angular offset of the axis of the piping element connection from the second axis is reduced to approximately zero; (h) stopping the apparatus or moving apart of the first roller and the second roller to prevent further thinning of the pipe wall and expansion of the pipe; and, (i) removing the piping element connection in which multiple outward steps have been formed.

According to still other aspects of the invention, a wrought metal piping element connection having multiple outward steps essentially parallel to the centerline of the piping element in at least one end is formed by the described method, and a copper piping connection has multiple outward steps essentially parallel to the centerline of the piping element, e.g. cold rolled, in at least one end.

According to another aspect of the invention, an apparatus for cold roll forming multiple, generally coaxial steps in a circumferential wall of a piping element having a base circumference and a base wall thickness comprises an outside roller die mounted for rotation about a first axis and an inside roller die mounted for rotation about a second axis, parallel to the first axis, at least one of the outside roller die and the inside roller die being mounted for pivoting movement about a pivot point on its respective axis, the outside roller die defines a first outside roller surface of rotation extending axially and centered about the first axis, a second outside roller surface of rotation extending axially and centered about the first axis, and a third outside roller surface of rotation extending axially and centered about the first axis, the first outside roller surface has a mean diameter, the second outside roller surface has a mean diameter, and the third outside roller surface has a mean diameter, the mean diameter of the third outside roller surface being less than the mean diameter of the second outside roller surface and greater than the mean diameter of the first outside roller surface. The inside roller die defines a first inside roller surface of rotation corresponding and opposed to the first outside roller surface, and extending axially and centered about the second axis, a second inside roller surface of rotation corresponding and opposed to the second outside roller surface and extending axially and centered about the second axis, and a third inside roller surface of rotation corresponding and opposed to the third outside roller surface and extending axially and centered about the second axis, the first inside roller surface having a mean diameter, the second inside roller surface having a mean diameter, and the third inside roller surface having a mean diameter, the mean diameter of the third inside roller surface being greater than the mean diameter of the second inside roller surface and less than the mean diameter of the first inside roller surface. The first, second and third outside roller surfaces are positioned for engagement with an outside surface of the wall of the piping element, and the first, second and third inside roller surfaces are positioned for engagement with an inside surface of the wall of the piping element. The first, second and third outside roller surfaces together with the first, second and third inside roller surfaces define a nip, the first axis, the second axis and the nip are disposed in a common plane. Means for driving at least the outside roller die or the inside roller die to rotate about its respective axis, and means for urging together the outside roller die and the inside roller die, each being mounted for relative movement together and apart, in the plane of the first axis, the second axis and the nip, in a manner to engage the wall of a piping element disposed in the nip therebetween and applying sufficient compressive force for forming by cold rolling of multiple steps by reducing the thickness of the wall of the piping element connection disposed therebetween in the nip. The first outside roller surface being disposed in substantial axial registration with the first inside roller surface, the second outside roller surface being disposed in substantial axial registration with the second inside roller surface, and the third outside roller surface being disposed in substantial axial registration with the third inside roller surface, and the second outside roller surface having an axial length and the second inside roller having an axial length, the axial length of the second outside roller surface being less than the axial length of the second inside roller surface to provide a predetermined spacing dependent upon the base wall thickness of the piping element in which multiple steps are to be formed. Whereby, during rotation of the outside roller die and the inside roller die, the wall thickness of the piping element is reduced about a first circumferential region of limited axial extent, a second region of limited axial extent, and a third region of limited axial extent, to increase the circumference of the piping element in the first, second and third circumferential regions by conservation of wall material, the degree of reduction of wall thickness, and the resulting circumference, in the third region being greater than the degree of reduction of wall thickness, and resulting circumference in the second region, and less than the degree of reduction of wall thickness, and resulting circumference in the first region, thereby to form by cold rolling multiple steps in a piping element connection placed in the nip between the outside and inside roller dies, the resulting circumference in the first, second and third regions being greater than the base circumference and the resulting wall thickness in the first, second and third regions being less than the base wall thickness. The bearing allowing equalization of the forces on the first, second and third regions as the outside roller die and the inside roller die are brought together. This equalization of forces provides for a high degree of uniformity in the thickness of each of the first, second and third regions.

In preferred embodiments of this aspect of the invention, the outside roller die mounted for rotation about the first axis is mounted on a spherical bearing for pivoting movement about a pivot point on the first axis.

Objectives of this invention include providing a convenient, low cost means for joining "standard water tube" size wrought copper and copper alloy tubing, fittings and valve connections to any combination of each other through use of conventional grooved end pipe couplings sized for use with "standard outside diameter" size steel pipe; as well as providing for joining "standard water tube" size wrought copper and copper alloy tubing, fittings and valve connections with end connections of steel, or any other suitable strength material, manufactured in accordance with the outside diameter dimensions of "standard outside diameter" size steel pipe.

The objectives also include providing a process for expansion of a tube end in a manner that does not create a restriction in the tube which can impede the flow in any way, and which also does not produce an area for potential accelerated abrasive damage.

These and other features of the invention will be apparent from the following description of a presently preferred embodiment, and from the claims.

DESCRIPTION OF THE PREFERRED EMBODIMENTS

This invention provides a convenient, low cost method and apparatus for utilizing grooved end pipe couplings designed and used for many years with IP size steel pipe for the joining of CT size wrought copper piping elements, or with any other wrought metal piping elements having a connection with an average outside diameter equal to or less than the average groove diameter commonly used for IP size steel pipe.

Briefly, according to the method of the invention, the end of a piping element connection is expanded in two or more steps by cold rolling the gasket seat diameter ($D_s$), groove diameter ($D_g$) and gasket seat width ($W_s$) to predetermined dimensions equivalent to those commonly used for grooved end IP size steel pipe connections.

The grooved piping industry has traditionally used the terms "groove width" and "groove diameter" and for the purpose of this describing this invention, these terms will be maintained, with "groove diameter" ($D_g$) representing the same surface as with conventional roll grooving and "groove width" ($W_g$) representing the width of the groove surface. A comparison of average outside diameters for IP size steel pipe and CT size copper tubing for the 2 through 6 inch sizes are shown in Tables I, II and III. The average outside diameter specifications for CT size tubing are given in ASTM B88, while the average outside diameters for IP size pipe are specified in ASTM A53, although other standards address these parameters as well.

Although the end connections of copper fittings and valve bodies can be formed in a manufacturing facility, it is important, in particular from a cost effective installation viewpoint, to be able to form the end connections of the copper tubing at an installation site.

TABLE I

Comparison of Average Outside Diameters
For CT Size Tubing and IP Size Pipe
in the 2–6 Inches Nominal Size Range

| Nominal Size | Average Outside Diameters (Inches) | | | |
|---|---|---|---|---|
| (Inches) | IP Size | Tolerance | CT Size | Tolerance |
| 2 | 2.375 | ±.024 | 2.125 | ±.002 |
| 2½ | 2.875 | ±.029 | 2.625 | ±.002 |
| 3 | 3.500 | +.035/−.031 | 3.125 | ±.002 |
| 4 | 4.500 | +.045/−.031 | 4.125 | ±.002 |
| 5 | 5.562 | +.056/−.031 | 5.125 | ±.002 |
| 6 | 6.625 | +.063/−.031 | 6.125 | ±.002 |

TABLE II

Tubes To Be Joined
(Tube Wall Thickness (Inches))

| NOMINAL | TYPE K ASTM B-88 | TYPE L ASTM B-88 | TYPE M ASTM B-88 | TYPE DMV ASTM B-306 |
|---|---|---|---|---|
| 2 | .083 | .070 | .058 | — |
| 2½ | .095 | .080 | .065 | — |
| 3 | .109 | .090 | .072 | .045 |
| 4 | .134 | .110 | .095 | .058 |
| 5 | .160 | .125 | .109 | .072 |
| 6 | .192 | .140 | .122 | .083 |

TABLE III

Pipe Schedules Commonly Joined
(Tube Wall Thickness (Inches))

| NOMINAL | SCH. 40 | SCH. 10 | SCH. 5 |
|---|---|---|---|
| 2 | .154 | .109 | .065 |
| 2½ | .203 | .120 | .083 |
| 3 | .216 | .120 | .083 |

TABLE III-continued

| | Pipe Schedules Commonly Joined (Tube Wall Thickness (Inches)) | | |
|---------|---------|---------|--------|
| NOMINAL | SCH. 40 | SCH. 10 | SCH. 5 |
| 4 | .237 | .120 | .083 |
| 5 | .258 | .134 | .109 |
| 6 | .280 | .134 | .109 |

According to the method of the invention, the multiple step expansion or cold rolling of the copper tubing end at the installation site is accomplished by use of a rolling operation which actually expands the end of the tube. The cold rolling operation can be performed at the installation site using roll grooving equipment that is generally used for the roll grooving of IP size steel pipe, where the roll grooving equipment is modified according to the invention.

Figures 5, 5A:
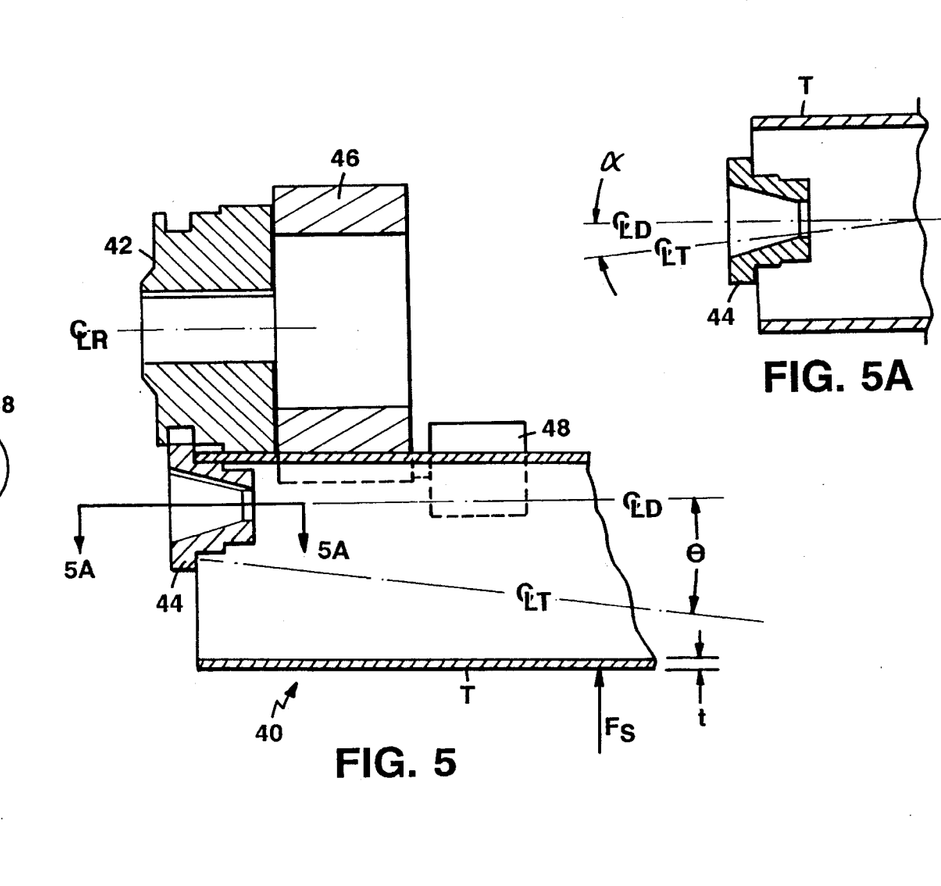
FIG. 5 is a side section view of a cold rolling apparatus of the method, suitable for preparing a dual outward step expansion in tubing according to the method of the invention.
FIG. 5A is a top section view of the cold rolling apparatus taken at the line 5A—5A of FIG. 5.
Figure 5B:
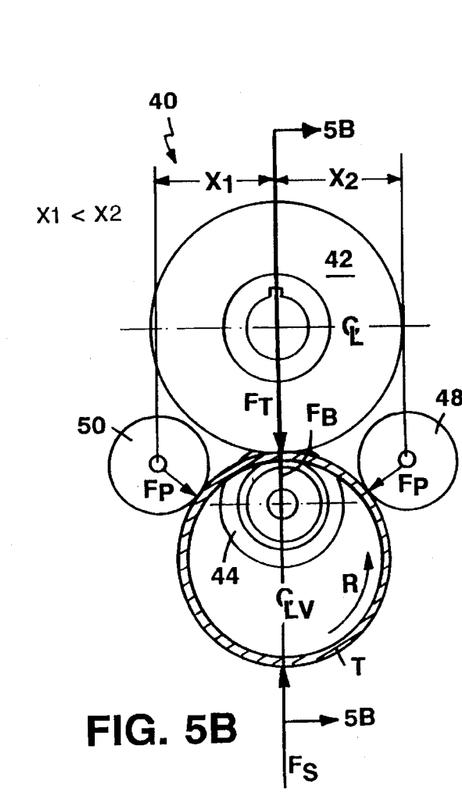
FIG. 5B is a front view of the cold rolling apparatus showing the initial relationship of the bottom roller element of the cold rolling apparatus of FIG. 5 and a tubing end to be prepared according to the invention.

Referring to FIGS. 5, 5A and 5B, in the case of dual outward step expanded piping element connections, an apparatus 40 of the invention requires modification to the steel pipe roll grooving equipment to include specially designed, corresponding top (driven) roller 42 and bottom (driving) roller 44, and an additional bracket 46 (FIG. 7B) for securing two positioning rollers 48, 50.

The top and bottom rollers 42, 44 are made of a hardened steel and the rollers are designed to expand the end of the tube, T, through a cold rolling operation, rather than to contour roll form a groove or channel in the end of the pipe as generally done for IP size steel pipe. The positioning rollers 48, 50 hold the tube in position during the tube end expansion operation, and, furthermore, provide downward and lateral forces to the tube, T, to prevent it from spiraling out from between the top and bottom rollers 42, 44 during the cold rolling operation. The components required for the dual outward step expansion, and the process for expansion, are described more fully below.

Figure 6:
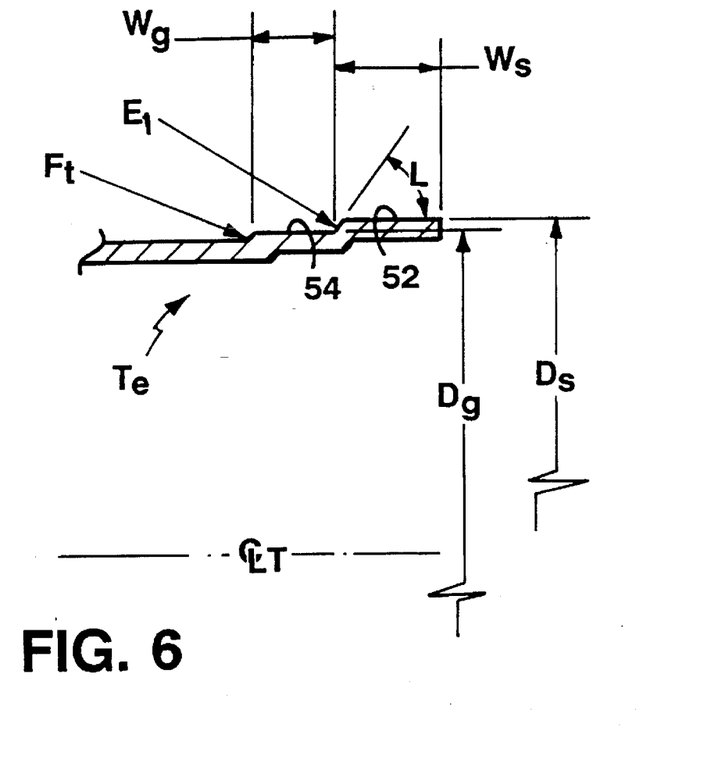
FIG. 6 is a side section view of a tubing end having a dual outward step expansion prepared according to the process of the invention.

Referring now to FIG. 6, in the expansion of the tube end, $T_e$, to form the groove diameter ($D_g$) and gasket seat diameter ($D_s$) according to the invention, the tubing end is radially outwardly expanded in two areas, which is referred to as a dual step expansion. The first step in the expansion establishes the gasket seat diameter (surface 52) and the second step establishes the groove diameter (surface 54). The critical dimensions for roll grooving of IP size steel pipe are shown in FIG. 3, and the critical dimensions associated with the dual step cold rolling expansion of CT size tubing are shown in FIG. 6.

The ability to produce acceptable outward steps at the end of the tube requires control of the gasket seat diameter ($D_s$), gasket seat width ($W_s$), groove diameter ($D_g$), groove width ($W_g$) and the cross sectional profile of the tube end.

Figure 7:
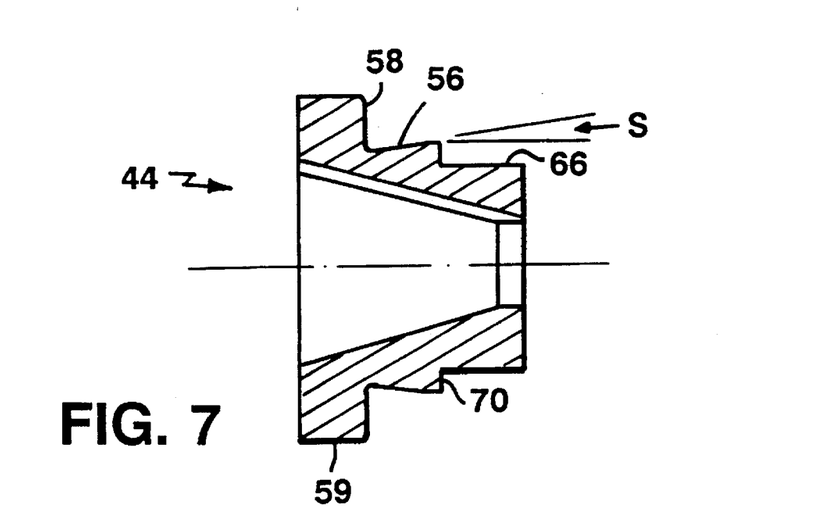
FIGS. 7 and 7A are respective side section views of the bottom (driving) roller element and the top (driven) roller element of the cold rolling apparatus of the invention.

In the establishment of the gasket seat diameter ($D_s$), a feature commonly referred to as "flare" must be controlled. Flare is the outward expansion of the gasket seat diameter outside of parallel with the centerline of the tubing ($\mathcal{C}_T$). It is measured as the maximum gasket seat diameter at the end of the tube. Excessive flare in CT size tubing can be more critical than in IP size pipe because the smaller wall thicknesses commonly associated with CT size tubing can allow one tube end to telescope into the other where there is excessive flare. The amount of flare can be controlled, and preferably eliminated altogether, by use of a suitable design for the bottom roller. As shown in FIG. 7, the surface 56 of the bottom roller 44 which forces the expansion of the gasket seat diameter is tapered slightly radially inwardly at angle, S (e.g., for practical purposes, approximately 1° to 3°) to distribute the tube forming load towards the back of the gasket seat. This slight inward taper is critical in the control of the amount of the tube end flare.

Cold rolling of the gasket seat width ($W_s$), groove width ($W_g$) and cross-sectional profile of the dual outward step tube end are dependent upon the geometric relationship between the top and bottom rollers 42, 44, the dimensional configurations of the top and bottom rollers and the thickness, t, of the tube. The top and bottom rollers must be positioned to provide a predetermined spacing, $S_r$, between the upper leading edge of the top roller 64 and the lower trailing edge of the bottom roller 70, thereby allowing displacement of the tubing into this area during the tube end thinning and, therefore, expansion operation. The spacing between the upper leading and lower trailing edges of the first and second rollers, respectively, is selected to be large enough to prevent the material of the wall from becoming too thin, or pinching, as the wall material is displaced between the rollers. A difference in the thickness of the tubing material will effect the amount of thinning and pinching that will occur. The top and bottom rollers are also dimensioned to provide the desired gasket seat width and groove width.

Referring again to FIG. 6, the shape of the tube end or connection profile is critical in maximizing the pressure retention capabilities of the coupling/connection joint. While the highest pressure retention capabilities can be achieved when the leading edge, $E_1$, of the gasket seat portion of expanded tube end is at perpendicular to both the groove diameter and to the seat diameter, this relationship is not advisable from a roll forming operation standpoint, as creation of a right angle can result in excessive pinching, especially with thinner tube walls. It has been determined that a more realistic leading edge angle, L, i.e. one providing adequate pressure retention capabilities in combination with minimal thinning of the tubing wall, will generally range from 50 to 85 degrees relative to the centerline of the tube ($\mathcal{C}_T$) and gasket seat diameter, however, leading edge angles down to about 30° are acceptable for use with copper tubing.

The dual outward step expansion roll forming process will now be described with reference to the FIGS. 8–11.

Phase 1

Figure 7A:
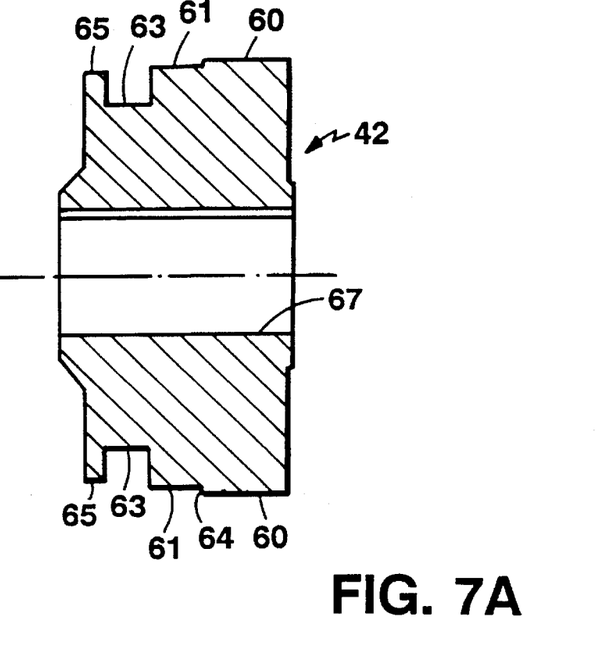
Figure 8:
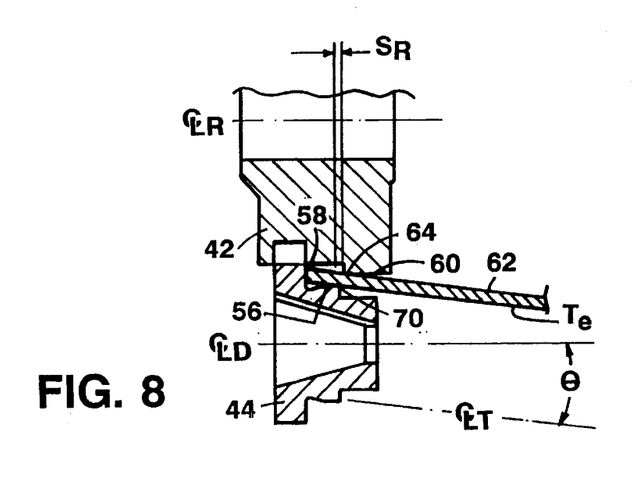
FIGS. 8, 9, 10 and 11 are sequential side section views of the cold rolling apparatus of the invention showing the sequence of the dual outward step tube expansion process of the invention.

Referring first to FIG. 8 (and also with reference to FIGS. 7 and 7A), tube, $T_e$, is positioned by the operator against the end surface 58 of the bottom roller 44 and rested on inwardly tapered surface 56. The top roller 42 is brought down by a force (pressure) actuated hydraulic actuator (not shown) and surface 60 of the top roller 42 is brought into contact with the outside surface 62 of the tube. At this point, the centerline of the tube ($\mathcal{C}_T$) is angularly offset vertically downward from the centerline ($\mathcal{C}_D$) of the driving or bottom roller 44 by the angle, Θ (approximately 1° to 2.5°). The tube has a tendency to drop, making angle Θ greater, unless an upward force is applied to support the tube. This support force can be provided by a pipe stand used to support longer tubes, or the operator can provide the required lifting force for shorter tube lengths. In FIG. 5A, the offset angle α is shown. This is the horizontal angle, between the centerline of the tube ($\mathcal{C}_T$) and the plane formed by the centerline of the bottom roller ($\mathcal{C}_D$) and the centerline of the top roller ($\mathcal{C}_R$), and is approximately 0.5° to 2° to the right when viewed with the driving roller 44 rotating counterclockwise (indicated by arrow, R, in FIG. 5B). Still referring to FIG. 5B, the centerline of each of the positioning rollers 48, 50 is located at unequal distances ($X_1$ and $X_2$) from the vertical centerline of the bottom roller ($\mathcal{C}_V$). The values of these dimensions will vary with the distance between the positioning rollers 48, 50 and the driving roller 44; however, typically the difference will be maintained in the range of 0.050 inch to 0.250 inch, and typically at about 0.125 inch. The placement of the tube, T, between the positioning rollers orients the centerline of the tube ($\mathcal{C}_T$) at an offset angle α. The tube positioning with the offset angle α causes the upper leading edge 64 of the top or driven roller 42 to produce a torque which tends to draw the tube, T, inward between the top and bottom rollers 42, 44, preventing the tube from spiraling out. This technique is also applicable to the conventional roll grooving of IP size steel pipe.

Phase 2

Figure 9:
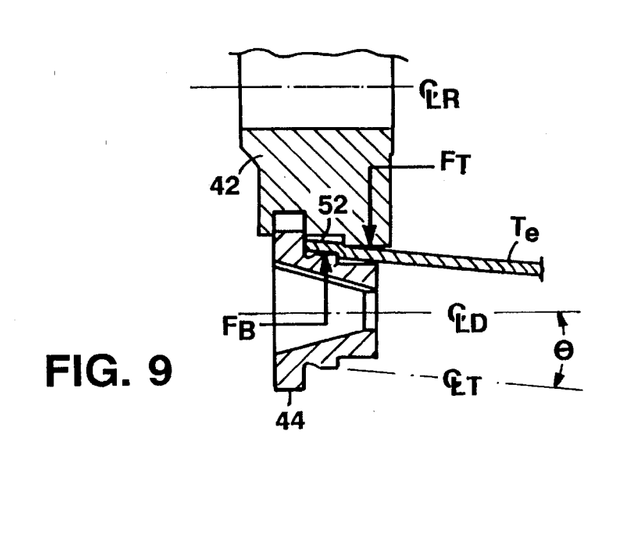

Referring now to FIG. 9, as the top roller 42 is displaced downward towards the bottom roller 44, the gasket seat surface 52 starts to be established through deformation of the tube wall material. The forces involved on the tube at this point are the vertical downward force ($F_T$) induced by surface 60 of the top roller 42, the vertical upward reaction force ($F_B$) maintained by surface 56 of the bottom roller 44, the two positioning forces ($F_P$) induced by the positioning rollers 48, 50, and the forces created by the dynamics of the rolling action of the top roller, bottom roller and the tube (see FIGS. 5, 5A and 5B for force locations). Since the vertical forces ($F_T$) and ($F_B$) are applied at offset locations along the longitudinal axis of the tube, a moment is created which tends to lift the tube off the support. In order to resist this tendency, it is necessary that a position roller 48 also be used on the right side of the driving roller 44 (when viewing the driving roller as rotating counterclockwise), in order to impose a resisting force to help keep the tube in proper orientation. As the end of the tube becomes deformed, the offset angle Θ is reduced. As described above, the surface 56 of the bottom roller 44 is tapered inwardly to distribute the reaction force ($F_B$) imposed by the bottom roller away from the end (tip) of the tube. As mentioned above, this taper is critical in controlling the amount of tube end flare.

Phase 3

Figure 10:
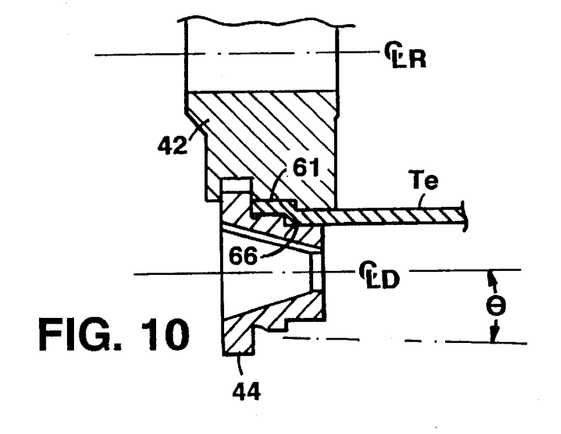

Referring next to FIG. 10, the top roller 42 is further displaced by the force induced by the hydraulic actuator until the inside diameter of the tube comes in contact with surface 66 of the bottom roller 44 and surface 61 of the top roller 42 comes in contact with the outside diameter surface 62 of the tube T. It is desirable to have these two contacts occur almost simultaneously, in order to maintain their radial dimensional relationship, as the top roller is displaced downward, and there should be no further increase in the application of force to the top roller as soon as the contacts are made. At this point, the gasket seat width ($W_s$) and the depth of the groove (i.e. the difference between the diameter of the seat ($D_s$) and the diameter of the groove ($D_g$)) have been defined and the vertical offset angle Θ has been further reduced. However, also at this point, Θ is approximately 0.4° to 1.6°. The forces imposed by the top and bottom rollers 42, 44 on the tube T are acting in the same direction as in Phase 2 (FIG. 9), although the forces are now distributed across the two additional surfaces, i.e. surface 66 of the bottom roller 44 and surface 61 of the top roller 42.

Phase 4

Figure 11:
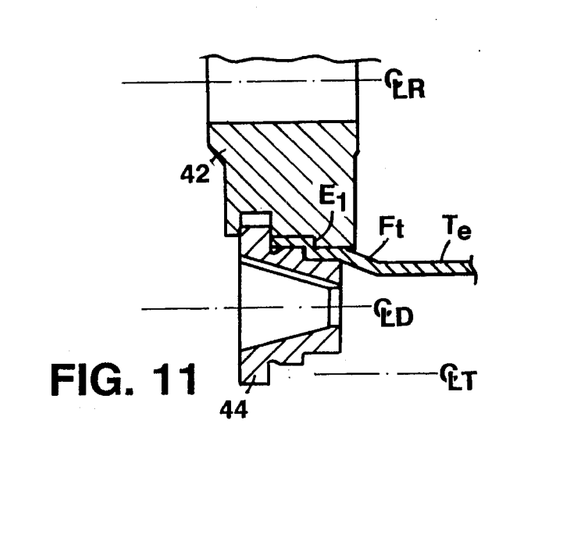

Referring to FIG. 11, at the beginning of this phase, no additional force is required to create further downward movement of the top roller 42; however, the existing force induced by the hydraulic actuator is sufficient to cause a small amount of vertical downward movement of this top roller in order to reduce the tube wall thickness. This thinning of the tube wall by the cold rolling operation causes the tube to be locally expanded. The trailing edge, $E_t$, is formed by a combination of the forces which are trying to thin the tube wall and expand the tube diameter along with the forces which are resisting the tube expansion. These forces act in opposite directions to each other and form a transition area in the tube which is being referred to as the trailing edge. The trailing edge is fully formed when the offset angle Θ is reduced to zero. However, the rotation and cold rolling (thinning) operation must be continued until the desired groove diameter is established at which point the cold rolling operation is complete. The apparatus must be shut off or the top roller 42 raised for removing the tube in order to prevent further thinning and expansion of the pipe. The piping element connection is then removed from the apparatus.

EXAMPLE

For the purpose of example only, the typical groove dimensions for a dual step, expanded end copper tube formed according to the method of the instant invention, are provided in Table B, shown below.

According to one preferred embodiment, the bottom roller 44 (FIG. 7) has an outer diameter of about 2.625 inches and an axial width of about 2.000 inches. The axial width of surface 59 is about 0.500 inch and the axial width of tapered surface 56 is about 0.563 inch. The maximum diameter of surface 56 is about 1.865 inches. The inner surface tapers at about 15°, from a diameter of 1.771 inches to 0.812 inch.

Referring to FIG. 7A, the top roller 42 has a maximum outer diameter (at surface 60) of about 5.218 inches and an axial width of about 2.779 inches. The axial width of surface 60 is about 1.028 inches. The outer diameter of surface 61 is about 5.064 inches and the axial width is about 0.625 inch. The outer diameter of surface 63 is about 4.121 inches and the axial width is about 0.535 inch. The outer diameter of surface 65 is about 4.877 inches and the axial width is about 0.250 inch. The inner bore 67 has a diameter of about 1.382 inches.

TABLE B

| | Groove Dimensions for Dual Step Flared Copper Tube (Inches) | | | |
|---|---|---|---|---|
| NOMINAL | $W_s$ | $W_g$ | $D_g$ | $D_s$ |
| 2 | .625 | .344 | 2.250–.015 | 2.375–.015 |
| 2½ | .625 | .344 | 2.720–.018 | 2.875–.018 |
| 3 | .625 | .344 | 3.344–.018 | 3.500–.018 |
| 4 | .625 | .344 | 4.334–.020 | 4.500–.020 |
| 5 | .625 | .344 | 5.395–.022 | 5.562–.022 |
| 6 | .625 | .344 | 6.455–.022 | 6.625–.022 |
| Tolerances: $W_s$, $W_g$ = ±.030 | | | | |

Figure 7B:
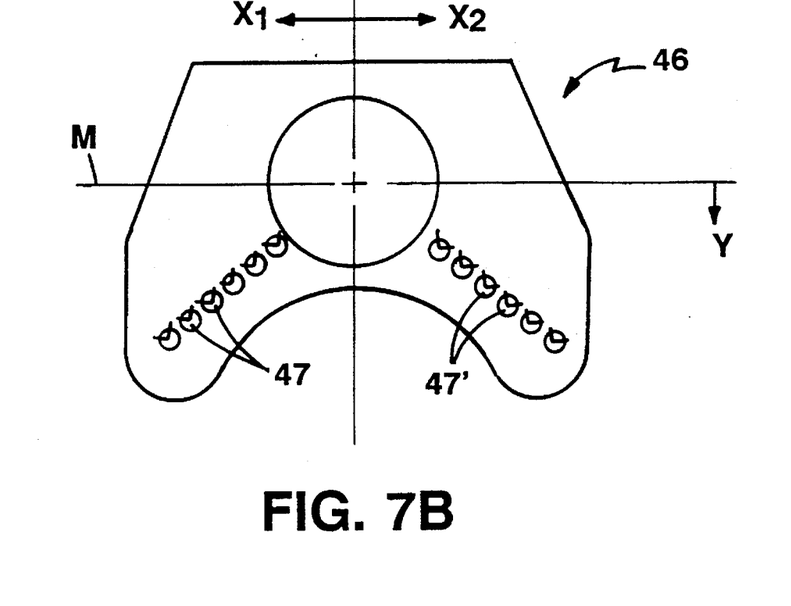
FIG. 7B is a face view of a positioning roller mounting bracket.

Referring to FIG. 7B, the positioning roller mounting bracket 46 defines sets of holes 47, 47' for fixing the positioning rollers 48, 50 with the desired spacing from the vertical centerline of the bottom roller ($X_1$ and $X_2$) and spacing below the center line, M, of the bracket mounting hole (Y), as described in Table C, below.

TABLE C

| Positioning Roller Spacing (Inches) | | | |
|---|---|---|---|
| NOMINAL | $X_1$ | $X_2$ | Y |
| 2 | 2.018 | 2.142 | 1.479 |
| 2½ | 2.546 | 2.670 | 1.918 |
| 3 | 2.990 | 3.114 | 2.433 |

TABLE C-continued

| | Positioning Roller Spacing (Inches) | | |
|---|---|---|---|
| NOMINAL | $X_1$ | $X_2$ | Y |
| 4 | 3.520 | 3.644 | 2.849 |
| 5 | 4.042 | 4.166 | 3.302 |
| 6 | 4.592 | 4.716 | 3.667 |

It has been found that if there is severe misalignment between the top and bottom rollers, a squeezing effect upon the tubing can occur, which can lead to material being forced from between the rollers along the axial direction. Even in the case of perfectly aligned rollers, the end of the tubing tends to expand more than the other areas, because there is less force resisting the expansion process there. This leads to a condition called "bell-mouthing" in which the outer diameter of the end of the tubing is slightly greater than the rest of the tubing and there is a slight taper to the exterior of the tubing which decreases as one proceeds further along the tubing from the end.

Figure 12:
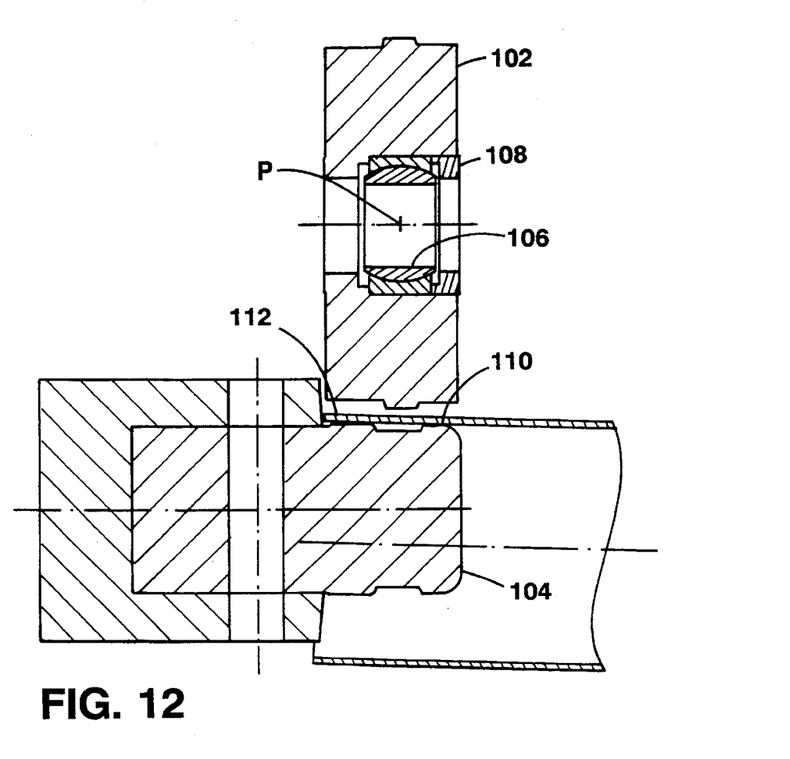
FIGS. 12, 13 and 14 are sequential side section views of another embodiment of a cold rolling apparatus of the invention showing a sequence of the tube expansion process of the invention.

Another embodiment of the invention, shown in FIG. 12 et seq., addresses these issues. Here, the top roller 102 is mounted to allow it to pivot about a center pivot point, P, to change alignment of its axis of revolution relative to the axis of revolution of bottom roller 104. This results in more equal expansion of the tubing for superior dimensional control. Even the bell-mouthing effect is minimized or avoided, because as the tubing end starts to grow relative to the other surfaces of the tube, its force against top roller 102 increases and top roller 102 adjusts pivotally so that there is a greater gap at the tube end than at other surfaces along the tube. Thus, the other surfaces will experience a relatively greater degree of thinning and will expand relatively faster. Once those surfaces are re-adjusted to match the tube end, top roller 102 pivots in the opposite direction, returning toward a more neutral position. Thus, by slight pivoting adjustment of top roller 102, all the surfaces see more equal thinning and expansion rates. This can lead to even better dimensional control between the surfaces than in the case of using perfectly aligned, but non-adjusting rollers.

Referring to FIG. 12, top roller 102 is mounted on a bearing 106, e.g. a spherical roller bearing or a spherical plain bearing. Bearing 106, held in place by an end cap 108, allows top roller 102 to pivot about point, P, in response to changes in tube alignment and tube wall thickness. Bottom roller 104 defines a back step 110 which permits an equalization of the forces over a gasket seat region 112 and back step 110 as top roller 102 pivots.

Figure 13:
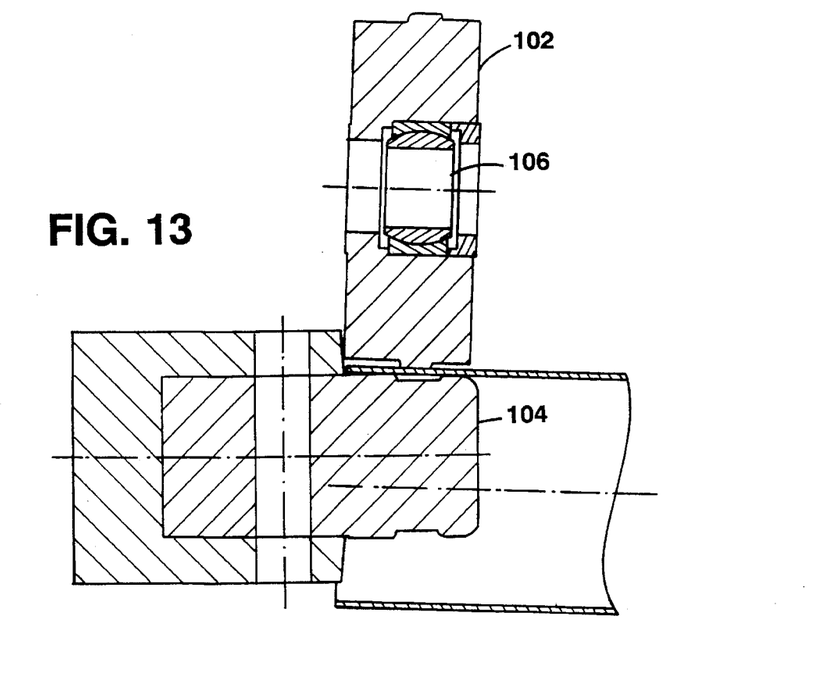
Figure 14:
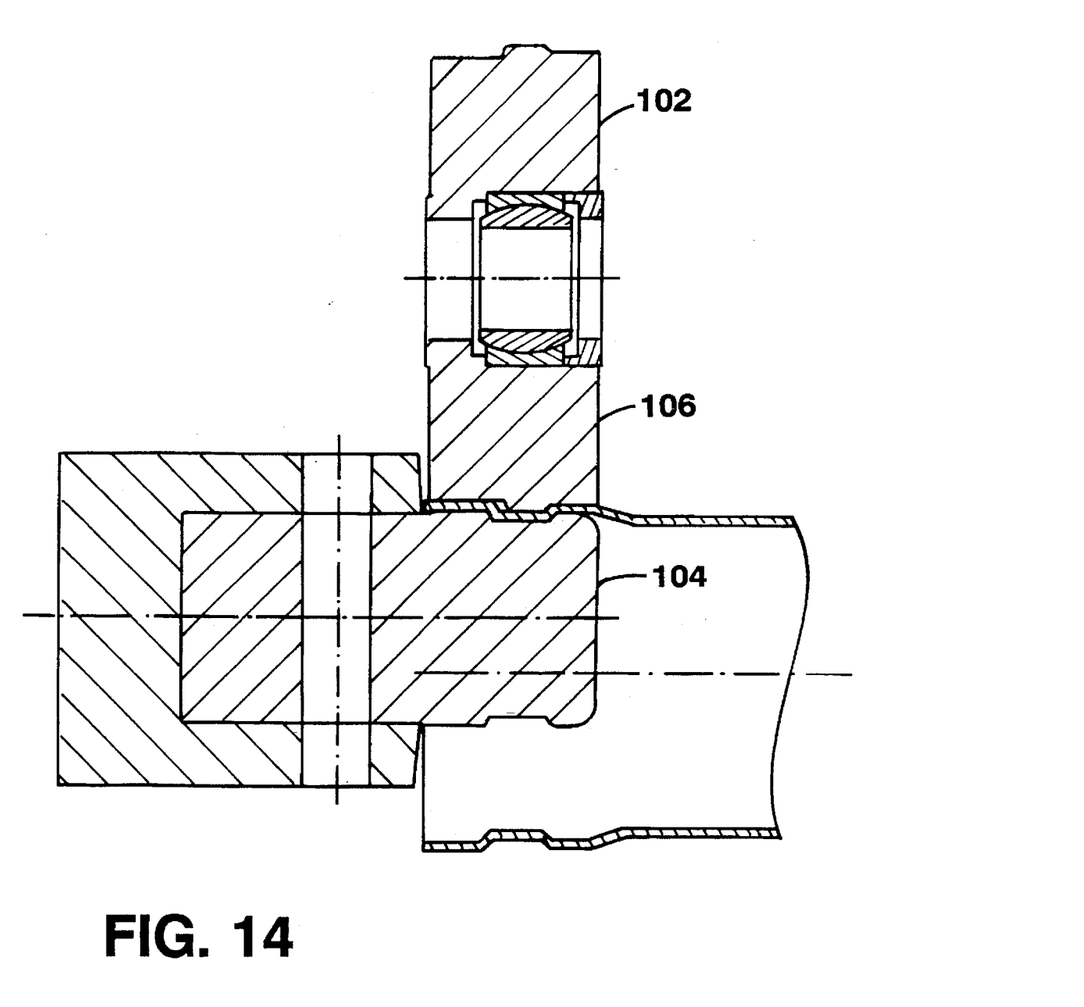

Referring to FIGS. 13 and 14, the expansion roll forming process is similar to that described above with reference to the FIGS. 8–11, although, in this case, when the top roller 102 is brought into contact with the outside surface of the tube, top roller 102 pivots to align its centerline with the centerline of the tubing. This distributes the forces placed upon back step 110 and seat region 112. During deformation of the tube wall material, top roller 102 pivots in response to changes in tube alignment and wall thickness resulting in more equal thinning and expansion of the tubing, as shown in FIG. 14.

These and other embodiments of the invention are within the following claims. For example, while there is shown and described herein certain specific characteristics embodying the invention, it will be apparent to those skilled in the art that various modifications and rearrangements of the components may be made without departing from the spirit and scope of the fundamental inventive concept and that this inventive concept is not limited to the particular forms shown and described herein. As an example, it would be desirable to apply the dual outward step cold rolled expansion technique to any type of wrought metal tubing, fitting or valve body connection having an average outside diameter which is equal to or less than the average groove diameter commonly specified for IP size steel pipe, so that it could be joined to the latter using a grooved end pipe coupling designed for use with the particular IP size steel pipe of interest. In addition, the end connection of wrought metal tubing, fittings or valve bodies having an average outside diameter significantly smaller than the average groove diameter commonly specified for IP size steel pipe could be expanded in three or more steps. The first roller may be the driving roller with the second roller being the driven roller.

What is claimed is:

1. An apparatus for cold roll forming multiple, generally coaxial steps in a circumferential wall of a piping element having a base circumference and a base wall thickness, said apparatus comprising an outside roller die mounted for rotation about a first axis, and an inside roller die mounted for rotation about a second axis, parallel to said first axis, at least one of said outside roller die and said inside roller die mounted for pivoting movement about a pivot point on its respective axis, said outside roller die defining a first outside roller surface of rotation extending axially and centered about said first axis, a second outside roller surface of rotation extending axially and centered about said first axis, and a third outside roller surface of rotation extending axially and centered about said first axis, said first outside roller surface having a mean diameter, said second outside roller surface having a mean diameter, and said third outside roller surface having a mean diameter, the mean diameter of said third outside roller surface being less than the mean diameter of said second outside roller surface and greater than the mean diameter of said first outside roller surface, said inside roller die defining a first inside roller surface of rotation corresponding and opposed to said first outside roller surface, and extending axially and centered about said second axis, a second inside roller surface of rotation corresponding and opposed to said second outside roller surface and extending axially and centered about said second axis, and a third inside roller surface of rotation corresponding and opposed to said third outside roller surface and extending axially and centered about said second axis, said first inside roller surface having a mean diameter, said second inside roller surface having a mean diameter, and said third inside roller surface having a mean diameter, the mean diameter of said third inside roller surface being greater than the mean diameter of said second inside roller surface and less than the mean diameter of said first inside roller surface, said first, second and third outside roller surfaces positioned for engagement with an outside surface of the wall of the piping element, and said first, second and third inside roller surfaces positioned for engagement with an inside surface of the wall of the piping element, said first, second and third outside roller surfaces and together with said first, second and third inside roller surfaces defining a nip, said first axis, said second axis and said nip disposed in a common plane, and means for driving at least said outside roller die or said inside roller die to rotate about its respective axis, and means for urging together said outside roller die and said inside roller die, each being mounted for relative movement together and apart, in said plane of said first axis, said second axis and said nip, in a manner to engage the wall of a piping element disposed in said nip therebetween and applying sufficient compressive force for forming by cold rolling of multiple steps by reducing the thickness of the wall of the piping element connection disposed therebetween in said nip, said first outside roller surface being disposed in substantial axial registration with said first inside roller surface, said second outside roller surface being disposed in substantial axial registration with said second inside roller surface, and said third outside roller surface being disposed in substantial axial registration with said third inside roller surface, and said second outside roller surface having an axial length and said second inside roller having an axial length, the axial length of said second outside roller surface being less than the axial length of said second inside roller surface to provide a predetermined spacing dependent upon the base wall thickness of the piping element in which multiple steps are to be formed, whereby, during rotation of said outside roller die and said inside roller die, the wall thickness of the piping element is reduced about a first circumferential region of limited axial extent, a second region of limited axial extent, and a third region of limited axial extent, to increase the circumference of the piping element in the first, second and third circumferential regions by conservation of wall material, the degree of reduction of wall thickness, and the resulting circumference, in the third region being greater than the degree of reduction of wall thickness, and resulting circumference in the second region, and less than the degree of reduction of wall thickness, and resulting circumference in the first region, thereby to form by cold rolling multiple steps in a piping element connection placed in said nip between said outside and inside roller dies, the resulting circumference in the first, second and third regions being greater than the base circumference and the resulting wall thickness in the first, second and third regions being less than the base wall thickness, said bearing allowing equalization of the forces on said first, second and third regions as said outside roller die and said inside roller die are brought together.

2. The apparatus for cold roll forming of claim 1, wherein said outside roller die mounted for rotation about said first axis is mounted on a spherical bearing for pivoting movement about a pivot point on said first axis.

* * * * *